United States Patent
Elings

(10) Patent No.: US 10,114,540 B2
(45) Date of Patent: Oct. 30, 2018

(54) INTERACTIVE USER INTERFACE INCLUDING LAYERED SUB-PAGES

(71) Applicant: Apple Inc., Cupertino, CA (US)

(72) Inventor: Michel Elings, Bussum (NL)

(73) Assignee: Apple Inc., Cupertino, CA (US)

( * ) Notice: Subject to any disclaimer, the term of this patent is extended or adjusted under 35 U.S.C. 154(b) by 665 days.

(21) Appl. No.: 14/303,575

(22) Filed: Jun. 12, 2014

(65) Prior Publication Data

US 2014/0372922 A1    Dec. 18, 2014

Related U.S. Application Data

(60) Provisional application No. 61/834,746, filed on Jun. 13, 2013.

(51) Int. Cl.
*G06F 3/048* (2013.01)
*G06F 3/0488* (2013.01)
*G06F 3/0483* (2013.01)

(52) U.S. Cl.
CPC .......... *G06F 3/0488* (2013.01); *G06F 3/0483* (2013.01)

(58) Field of Classification Search
None
See application file for complete search history.

(56) References Cited

U.S. PATENT DOCUMENTS

| | | | | |
|---|---|---|---|---|
| 5,880,733 A | * | 3/1999 | Horvitz | G06F 3/04815 345/427 |
| 2003/0014415 A1 | * | 1/2003 | Weiss | G06F 17/30905 |
| 2003/0128242 A1 | * | 7/2003 | Gordon | G06F 3/04815 715/848 |
| 2003/0198378 A1 | * | 10/2003 | Ng | G06K 9/20 382/154 |
| 2005/0146521 A1 | * | 7/2005 | Kaye | G06T 3/00 345/419 |
| 2010/0057566 A1 | * | 3/2010 | Itzhak | G06F 17/30873 705/14.53 |
| 2010/0097322 A1 | * | 4/2010 | Hu | G06F 3/04883 345/173 |
| 2012/0038625 A1 | * | 2/2012 | Kim | G06F 3/04815 345/419 |
| 2012/0192121 A1 | * | 7/2012 | Bonnat | G06F 3/0488 715/863 |
| 2012/0216110 A1 | * | 8/2012 | Kariya | G06F 17/3089 715/234 |
| 2013/0080471 A1 | * | 3/2013 | Forte | G06F 21/6218 707/785 |

* cited by examiner

*Primary Examiner* — Mahelet Shiberou
(74) *Attorney, Agent, or Firm* — Fletcher Yoder PC

(57) ABSTRACT

Some embodiments provide a user interface that includes a top page having an x-axis and a y-axis that extend at least partially along horizontal and vertical directions, and an imaginary z-axis that extends into the depth of the top page. The user interface of some embodiments includes a first subpage that is accessible from a top page and a second subpage, which is further in depth along the z-axis than the first subpage, that is accessible from the first subpage. The top page may change in appearance throughout the duration of time when at least the first subpage is shown to place focus away from the top page.

20 Claims, 4 Drawing Sheets

INTERACTIVE USER INTERFACE INCLUDING LAYERED SUB-PAGES

CLAIM OF BENEFIT TO PRIOR APPLICATIONS

This application claims the benefit of U.S. Provisional Patent Application 61/834,746, filed Jun. 13, 2013. U.S. Provisional Patent Application 61/834,746 is incorporated herein by reference.

FIELD OF INVENTION

This disclosure relates to a method of providing information on an electronic user interface.

BACKGROUND

With the proliferation of portable electronic devices today, many users are migrating away from their reliance on paper-based products and handling their daily tasks with their electronic devices. For example, users read news, communicate with others (e.g. via electronic mail), manage their schedules, and read magazines using their portable electronic devices. Before the advent of portable electronic devices, handling these tasks would have required newspapers, letters, calendars, and magazines. However, when interfaced electronically, the visual information that was presented and communicated through pages and volumes of paper is distilled down to just one user interface—the display on the electronic device.

The size of the display is limited by the portability of the device because if the display becomes too large, the device will be too bulky or too heavy to be carried easily. Furthermore, even if the display could be made larger without adding significantly to the size or weight (for example, if the display were foldable), the display is unlikely to provide the amount of communication real estate that was covered by the newspapers, magazines, stationery, and calendars.

Hence, digital content providers are faced with the challenge of how to effectively provide all the desired information without cluttering up the user interface.

BRIEF SUMMARY

Embodiments described herein provide a user interface (UI) that is capable of dramatically increasing the information real estate by layering several pages at least partially on top of one another. In some embodiments, the UI includes a page (e.g., a cover page, a top page) that is defined by an x-axis and a y-axis, which extend at least partially along horizontal and vertical directions, and an imaginary z-axis, which extends into the depth of the page. The UI also includes several subpages that are positioned along the z-axis at various depths.

The UI of some embodiments includes a first subpage that is accessible from a top page and a second subpage, which is further in depth along the z-axis than the first subpage, that is accessible from the first subpage. In some embodiments, the top page changes in appearance throughout the duration of time when at least the first subpage is shown to place focus away from the page and returns to the page's previous appearance when the first subpage is not shown. The first subpage may also changes in appearance throughout the duration of time when the second subpage is shown to place focus away from the first subpage and returns to the first subpage's previous appearance when the second subpage is not shown.

Different embodiments use different techniques to unclutter a view when a subpage is displayed. In some embodiments, a non-featured page changes in appearance with a set of one or more elements. The set of elements may disappear from the page, or remain in the page but appear lighter, smaller, or faded. In some embodiments, the set of elements includes at least one of an image (e.g., a photo, an illustration or dawning), a media clip element, and a text element.

In some embodiments, the top page includes a first affordance (e.g., a selectable item) to show the first subpage and the first subpage includes a second affordance to show the second subpage. In some embodiments that use a touch-screen display, the first and second subpages appear with a single touch-based gesture (e.g., over the first and second affordances on the touch-screen display). The first and second subpages may be concurrently shown on the touch screen display throughout at least a portion of the duration of the touch-based gesture and disappears upon completion of the touch-based gesture. In some embodiments, the touch-based gesture includes a touch and hold operation on the surface of touch-screen display over the first affordance and a slide operation to the second affordance without releasing the hold of the surface.

In some embodiments, the affordance on the page is a selectable item, such as a hot spot, a highlighted region, a marked region, a UI control, etc. In some embodiments, a user's selection of one of the affordances causes a presentation to be started in a subpage. The presentation may be a slide show presentation, a playback of a media clip (e.g., a video clip, an audio clip) or animation (e.g., 3D animation). In some embodiments, the presentation starts when the subpage is activated, and stops or pauses when the subpage is deactivated. The presentation may be restarted or may resume playing from the point it left off once the subpage is activated again.

The preceding Summary is intended to serve as a brief introduction to some embodiments as described herein. It is not meant to be an introduction or overview of all subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

Figure 1:
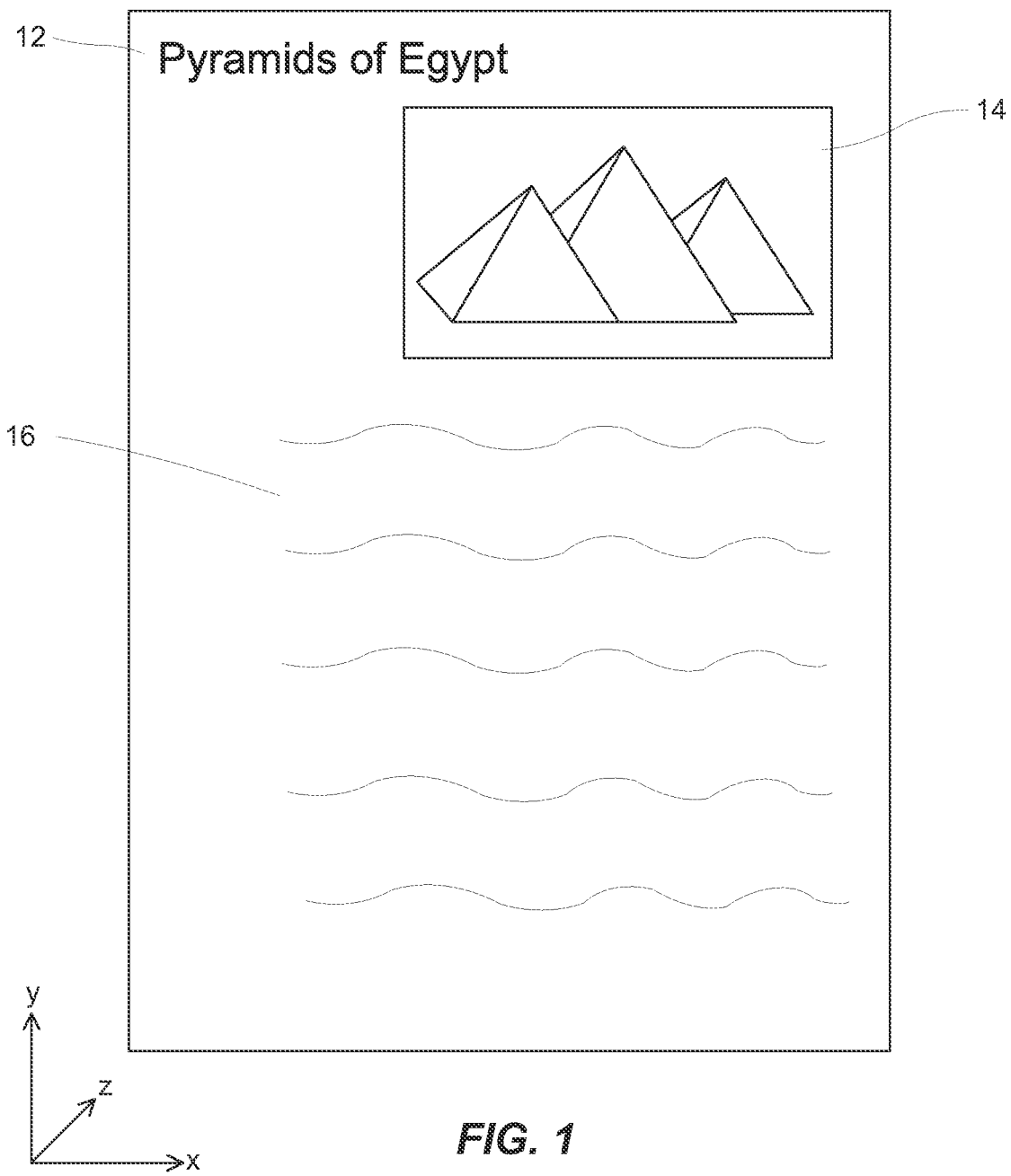
FIG. 1 illustrates an example view of a page that is associated with a number of subpages.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

One way to present information without cluttering up the user interface page is to present more information in response to some kind of user input or activation. For example, a starting page may show a map of the world, and have buttons along one side that say, "Touch this button to see what animals live in Africa," "Touch this button to see what animals live in North America," and "Touch this button to see what animals live in South America." In response to a touch of a button, pictures of animals corresponding to the correct continent may pop up.

However, this type of interaction provides only a small amount of extra information real estate, and often does not help avoid the visual clutter problem because the buttons and their descriptions that have to be added to the starting page. Furthermore, the pop-up information is often displayed on top of the starting page, adding to the overcrowded look.

The inventive concept disclosed herein is capable of dramatically increasing the information real estate without cluttering the user interface. In the inventive concept, a user interface page includes a plurality of sub-pages positioned "on top of" one another. In other words, according to the inventive concept, a user interface page has an x-axis and a y-axis that extend along the horizontal and vertical edges of the physical display, and an imaginary z-axis that extends into the depth of the displayed page. Sub-pages are positioned along the z-axis at various depths, and each sub-page can be accessed from one of the sub-pages at a "shallower" depth via activation of an interactive element. User interaction at the top page can reveal a first sub-page that is "hidden" beneath the top page, and user interaction at the first sub-page may reveal further information that is in the second sub-page.

In an embodiment where the display surface is a touch-screen, the user interaction may be keeping a finger in contact with an interactive element on the top page to access the first sub-page. The interactive element may be implemented as a "hot spot" or a highlighted/marked region but this is not a limitation of the disclosure. The first sub-page may have one or more interactive elements of its own, and these interactive elements in the first sub-page may be activated by the user's sliding his finger over to the interactive elements without losing contact with the display. When the user lifts his finger, losing contact with the physical display surface, the sub-pages disappear and the starting page is displayed the way it was before the sub-pages were activated. The "finger down" gesture is just an example of an interaction that could work, and the inventive concept is not limited to any specific type of user input or gesture.

FIG. 1 depicts an example of a top page view that may be displayed to a user upon accessing a digital content page. A "top page," as used herein, is the page that is displayed without the user interacting directly with that page. As shown, the top page in this example includes a title 12, an image 14, and some text 16. Each of the title 12, the image 14, and the text 16 may be its own sub-page, wherein the subpages are transparent and superimposed on top of one another to form the complete top page. For clarity of illustration, let's suppose that the image 14 is on a subpage where z=0 (z being the depth coordinate, as shown in FIG. 1). The title 12 is on a subpage where z=1, and the text 16 is on a subpage where z=2. A user may place his finger on the image 14 and keep it held down on the display surface to activate the sub-page of the image 14.

Figure 2:
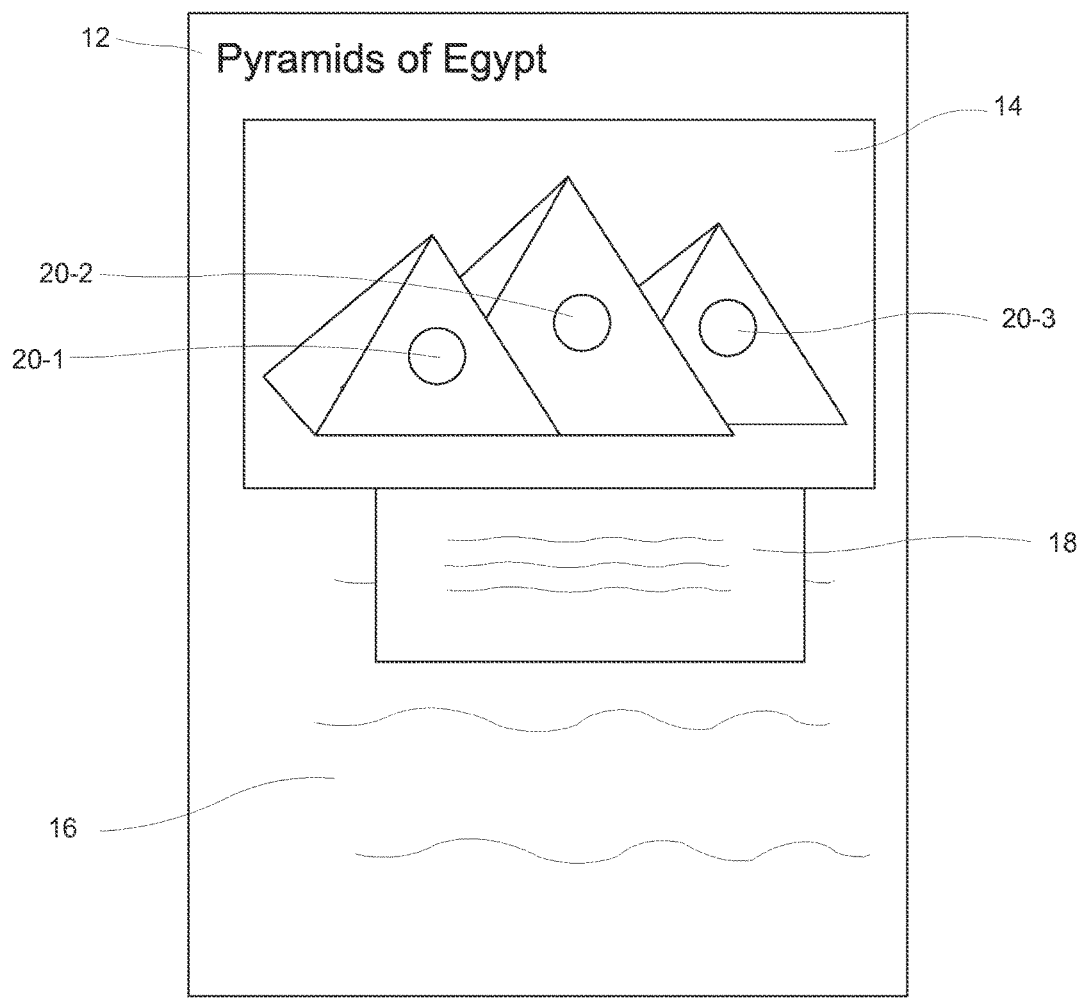
FIG. 2 illustrates several example results that follow activation of an image on a page.

FIG. 2 depicts one or more results that follow activation of the image 14. In response to the activation of the sub-page that includes the image 14, the image 14 may be made larger. Optionally, new text 18 may appear to provide additional information. Alternatively or in addition, hot spots 20-1, 20-2, and 20-3 (collectively hot spots 20) may appear. These hot spots may be other types of interactive elements that can be activated by the user. Although difficult to depict in the figure, activation of the image 14 may "ghost" the title 12 and the text 16 by making them appear lighter or faded, further guiding the user's focus to the activated element (image 14). In some embodiments, activation of the image 14 may make the title 12 and the text 16 disappear altogether.

In the example of FIG. 2, location of a hot spot 20 is indicated by a brightly colored circle. However, this is not a limitation of the invention and other indications may be used to let the user know where the interactive elements are. For instance, an element on a page or sub-page may be highlighted, presented differently than other elements, etc.

If the user takes his finger off the display surface, image 14 will go back to its original state and the user will immediately be returned to the top page view of FIG. 1. If on the other hand, the user keeps his finger on the display surface and slides it onto hot spot 20-1, another sub-page with new content (e.g., a description of the pyramid on which the hot spot 20-1 is positioned) will appear. This may be a sub-page at depth level z=3. Sliding the finger to hot spot 20-2 will reveal yet another sub-page at depth level z=4 with further new content, as will sliding the finger to hot spot 20-3 (at z=5).

The multi-layered approach allows new content to be displayed on top of contents on the sub-pages at a "shallower" depth. To avoid cluttering the view, the content at the shallower depth may be ghosted or made to disappear, allowing the user to focus on the content at the current depth. In this manner, the user can navigate through all the different pages (e.g., an electronic book) with a single touch-based gesture or by chaining a number of touch-based gestures (e.g., touch, slide, slide again) while keeping the user's finger on the surface of the touch-screen display. The user does not have to individually turn different pages of book, or open or close different display areas (e.g., sub-pages) of a user interface. The same elements may return to their previous state upon user input to return to the previous depth view.

Some sub-pages may be capable of being activated from more than one depth. Further, some sub-pages may not disappear or get "ghosted" even when a deeper sub-page is opened. For example, the title 12 may be configured to stay in a constant state regardless of which depth level sub-page is being accessed.

In some embodiments, touching one or more of the hot spots 20-1, 20-2, 20-3 may trigger a video or slide show. In some embodiments, the video presentation or slide show presentation starts when the subpage is activated, and stops or pauses when the subpage is deactivated. The presentation may be restarted or may resume playing once the subpage is activated again. In yet another embodiment, where the object that is shown in the activated sub-page is depicted three-dimensionally, a user may be able to turn the three-dimensional object by moving his finger on the object without lifting it. Even the top page may contain animations or three-dimensional images to create a visual sense of depth, to help convey to the user that he is going into the z-axis by activating the interactive elements. Various techniques for creating a perceived depth may be used.

Figure 3:
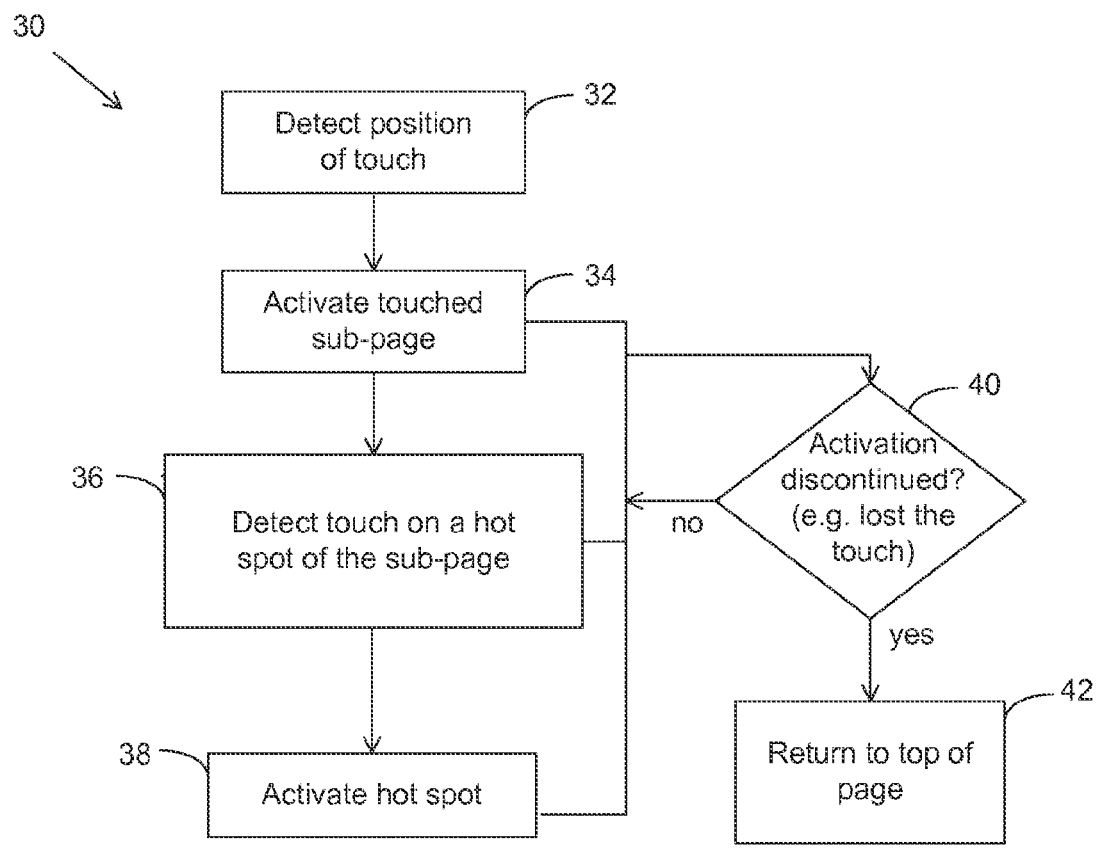
FIG. 3 conceptually illustrates a flowchart with an example sub-page activation process in accord with some embodiments of the invention.

FIG. 3 is a flowchart illustrating a sub-page activation process 30 in accordance with the inventive concept. The sub-page activation process 30 begins when a touch is detected and its position is determined (step 32). The determined touch position is used to identify the sub-page and activate it (step 34). Once the sub-page is activated, there may be hot spots presented on the sub-page. If the user touches or otherwise activates one of the hot spots, the activation/touch on the hot spot is detected (step 36) and the hot spot is activated (step 38). As mentioned above, activation of hot spot may include presentation of new text and/or image, showing a video or slide show, turning a three-dimensional image, etc. Through the entire sub-page activation process 30, it is continually checked whether the activation is discontinued, for example if the touch is lost (step 40) because the user took his finger off the display. If the activation is discontinued, the top page is immediately displayed in response to the discontinued activation (step 42). When the top page is displayed, any extra information that was presented in response to activation of the sub-page in step 34 disappears.

Figure 4:
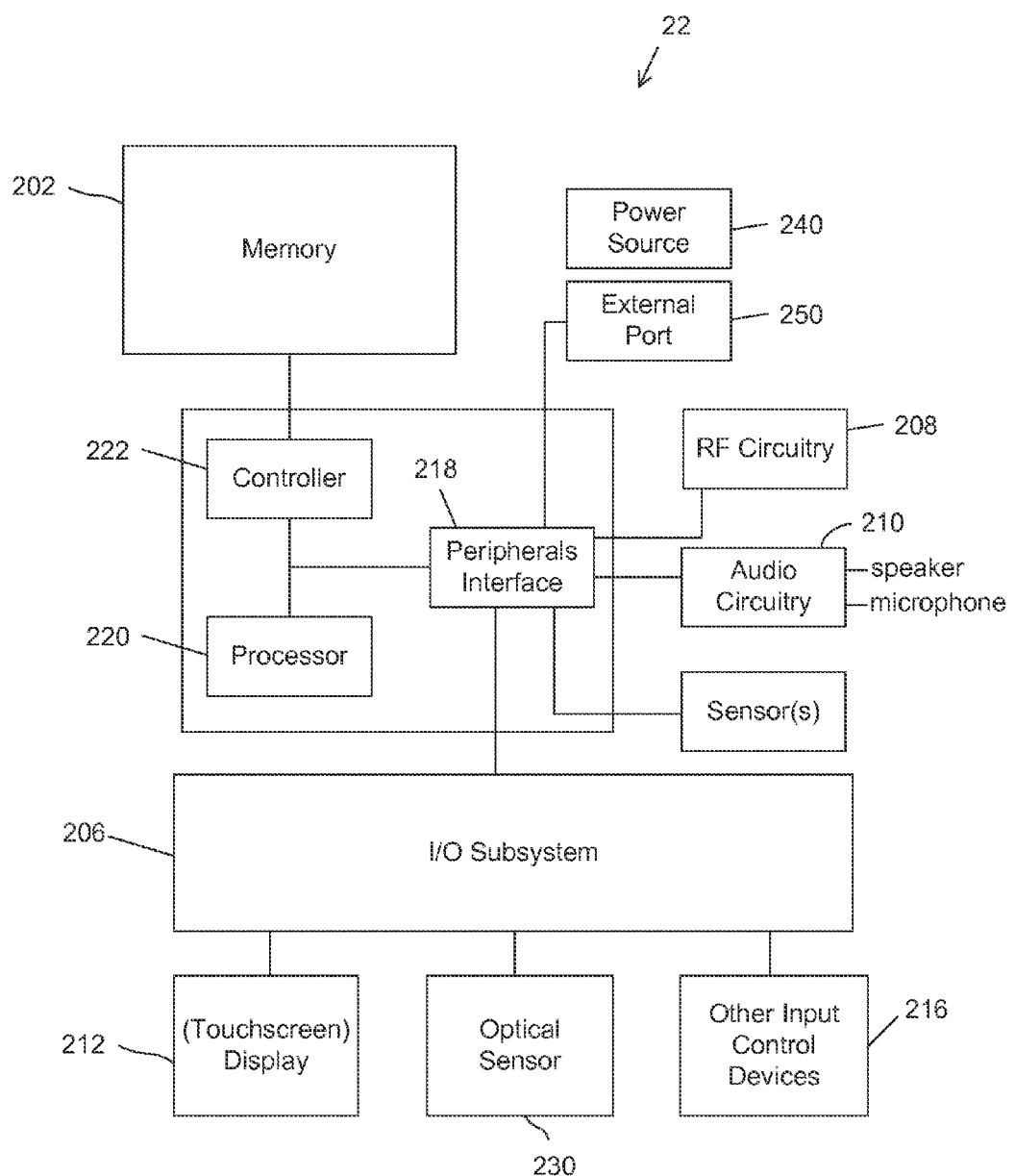
FIG. 4 conceptually illustrates a computing device with which some embodiments of the invention are implemented.

FIG. 4 is a block diagram illustrating an example display device 22 that may be used to implement the inventive concept described above. As shown, the display device 22 may incorporate the display 14, which may be a touchscreen display. The display device 22 includes a memory 202 (which may include one or more computer-readable storage mediums), a memory controller 222, a processing unit 220, a peripherals interface 218, RF circuitry 208, audio circuitry 210 that control the speaker and microphone, an input/output subsystem 206, other input control devices 216, and optional optical sensor 230. These components may communicate over one or more communication buses or signal lines. The display device 22 also has a power source 240 for powering the components. The power source 240 may include a power management system, one or more power sources (e.g., battery, alternating current), a recharging system, a power failure detection circuit, a power converter, or inverter, and a power status indicator, among others. An external port 250 allows the display device 22 to communicate with a network outside the physical boundaries of the device.

Various embodiments of the present invention may be implemented in or involve one or more computer systems. The computer system is not intended to suggest any limitation as to scope of use or functionality of described embodiments. The computer system includes at least one processing unit and memory. The processing unit executes computer-executable instructions and may be a real or a virtual processor. The computer system may include a multi-processing system which includes multiple processing units for executing computer-executable instructions to increase processing power. The memory may be volatile memory (e.g., registers, cache, random access memory (RAM)), non-volatile memory (e.g., read only memory (ROM), electrically erasable programmable read only memory (EEPROM), flash memory, etc.), or combination thereof. In an embodiment of the present invention, the memory may store software for implementing various embodiments of the present disclosure.

Further, the computer system may include components such as storage, one or more input computing devices, one or more output computing devices, and one or more communication connections. The storage may be removable or non-removable, and includes magnetic disks, magnetic tapes or cassettes, compact disc-read only memories (CD-ROMs), compact disc rewritables (CD-RWs), digital video discs (DVDs), or any other medium which may be used to store information and which may be accessed within the computer system. In various embodiments of the present invention, the storage may store instructions for the software implementing various embodiments of the present invention. The input computing device(s) may be a touch input computing device such as a keyboard, mouse, pen, trackball, touch screen, or game controller, a voice input computing device, a scanning computing device, a digital camera, or another computing device that provides input to the computer system. The output computing device(s) may be a display, printer, speaker, or another computing device that provides output from the computer system. The communication connection(s) enable communication over a communication medium to another computer system. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media includes wired or wireless techniques implemented with an electrical, optical, RF, infrared, acoustic, or other carrier. In addition, an interconnection mechanism such as a bus, controller, or network may interconnect the various components of the computer system. In various embodiments of the present invention, operating system software may provide an operating environment for software's executing in the computer system, and may coordinate activities of the components of the computer system.

Various embodiments of the present disclosure may be described in the general context of computer-readable media. Computer-readable media are any available media that may be accessed within a computer system. By way of example, and not limitation, within the computer system, computer-readable media include memory, storage, communication media, and combinations thereof. As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium", and "non-transitory machine readable medium", are entirely restricted to tangible, physical objects that store information in a form that is readable by a computing device. These terms exclude any wireless signals, wired download signals, and any other ephemeral signals.

Having described and illustrated the principles of the inventive concept with reference to described embodiments, it will be recognized that the described embodiments may be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the described embodiments shown in software may be implemented in hardware and vice versa.

While the exemplary embodiments of the present invention are described and illustrated herein, it will be appreciated that they are merely illustrative.

What is claimed is:

1. A non-transitory machine readable medium storing a program that comprises computer instructions for:
presenting a user interface (UI) comprising a page having an x-axis and a y-axis that extend at least partially along horizontal and vertical directions, and an imaginary z-axis that extends into the depth of the page;
presenting a first subpage of a plurality of subpages on the page positioned along the z-axis at a first depth, wherein the first subpage is accessible from the page;
in response to receiving a first selection of the first subpage, generating one or more selectable items on the first subpage;
in response to receiving a second selection of a selectable item of the one or more selectable items, presenting a second subpage of the plurality of subpages on the page positioned along the z-axis at a second depth greater than the first depth, causing the second subpage to appear to extend further into the page than the first subpage by changing in appearance the first subpage to appear lighter or faded relative to the second subpage, wherein the second subpage is accessible from the first subpage; and
in response to receiving an indication that the first selection of the first subpage is discontinued, removing presentation of the second subpage from the page.

2. The non-transitory machine readable medium of claim 1, wherein the page changes in appearance with a set of elements on the page disappearing, appearing lighter, or appearing faded when the first subpage is presented.

3. The non-transitory machine readable medium of claim 2, wherein the set of elements includes at least one of an image and a text element.

4. The non-transitory machine readable medium of claim 1, wherein the UI is implemented with a touch-screen display, wherein a single touch-based gesture on the touch-screen display over the first subpage and the selectable item provides the first selection and the second selection.

5. The non-transitory machine readable medium of claim 4, wherein the first subpage and the second subpage are concurrently presented on the touch screen display throughout at least a portion of the duration of the single touch-based gesture, and wherein removing the presentation of the second subpage occurs upon completion of the single touch-based gesture.

6. The non-transitory machine readable medium of claim 5, wherein the single touch-based gesture includes a touch and hold operation on the touch screen display over the first subpage and a slide operation to the selectable item without releasing the hold on the touch screen display.

7. The non-transitory machine readable medium of claim 1, wherein each selectable item of the one or more selectable items comprises at least one of a hot spot, a highlighted region, and a marked region on the first subpage.

8. The non-transitory machine readable medium of claim 1, wherein a user's selection of one of the first subpage and the selectable item causes a video clip, a 3D animation presentation, or a slide show presentation to played.

9. The non-transitory machine readable medium of claim 1, wherein the page is a top page, wherein the plurality of subpages are transparent and superimposed at least partially on top of one another of according to the z-axis positioning to form the top page.

10. The non-transitory machine readable medium of claim 1, comprising, in response to receiving the first selection of the first subpage, enlarging the first subpage.

11. The non-transitory machine readable medium of claim 1, comprising, in response to receiving the first selection of the first subpage, presenting text outside of the first subpage associated with the first subpage.

12. A method comprising:
providing a user interface (UI) comprising a page having an x-axis and a y-axis that extend at least partially along horizontal and vertical directions, and an imaginary z-axis that extends into the depth of the page;
presenting a first subpage of a plurality of subpages on the page positioned along the z-axis at a first depth, wherein the first subpage is accessible from the page;
in response to receiving a selection of at least a portion of the first subpage, presenting a second subpage of the plurality of subpages on the page positioned at a second depth greater than the first depth along the z-axis, causing the second subpage to appear to extend further into the page than the first subpage by changing in appearance the first subpage to appear lighter or faded relative to the second subpage, wherein the second subpage is accessible only from the first subpage; and
in response to receiving an indication that the selection of at least the portion of the first subpage is discontinued, removing presentation of the second subpage from the page.

13. The method of claim 12, wherein the page changes in appearance with a set of elements on the page disappearing, appearing lighter, or appearing faded when the first subpage is presented.

14. The method of claim 13, wherein the set of elements includes at least one of an image and a text element.

15. The method of claim 12, comprising receiving the selection of at least the portion of the first subpage via a selectable item of the first subpage.

16. The method of claim 15, wherein the UI is implemented with a touch-screen display, wherein a single touch-based gesture on the touch-screen display over the first subpage and the selectable item provides the selection of at least the portion of the first subpage.

17. The method of claim 16, wherein the first subpage and the second subpage are concurrently presented on the touch screen display throughout at least a portion of the duration of the single touch-based gesture, and wherein removing the presentation of the second subpage occurs upon completion of the single touch-based gesture.

18. The method of claim 17, wherein the single touch-based gesture includes a touch and hold operation on the touch screen display over the first subpage and a slide operation to the selectable item without releasing the hold on the touch screen display.

19. The method of claim 15, wherein the selectable item comprises at least one of a hot spot, a highlighted region, and a marked region on the first subpage.

20. The method of claim 12, comprising, in response to receiving a selection of at least the portion of the first subpage, enlarging the first subpage and presenting text outside of the first subpage associated with the first subpage.

* * * * *